United States Patent [19]

Kato et al.

[11] 3,837,738

[45] Sept. 24, 1974

[54] AUDIO-VISUAL APPARATUS INCLUDING MAGNETIC SHEET MOUNTING AND HOLD-DOWN MEANS

[76] Inventors: Saburo Kato, c/o Kabushiki Kaisha Ricoh, 3-6, 1-Chome, Naka-magome, Ohta-Ku, Tokyo; Saburo Hokari, 345, Futako, Kawasaki-Shi, Kanagawa-Ken, Japan

[22] Filed: May 21, 1973

[21] Appl. No.: 362,406

Related U.S. Application Data

[62] Division of Ser. No. 174,701, Aug. 25, 1971, Pat. No. 3,752,574.

[52] U.S. Cl. .................................................. 353/23
[51] Int. Cl. .............................................. C03b 1/48
[58] Field of Search ............. 353/22, 23, 24, 27, 38, 353/65, 66, 67, 98, 99, 120

[56] References Cited

UNITED STATES PATENTS

| | | | |
|---|---|---|---|
| 2,647,437 | 8/1953 | Bently | 353/67 |
| 3,340,765 | 9/1967 | Herriott | 353/38 |
| 3,352,201 | 11/1967 | Brownscombe | 353/27 |

*Primary Examiner*—Louis R. Prince
*Assistant Examiner*—A. Jason Mirabito
*Attorney, Agent, or Firm*—McGlew and Tuttle

[57] ABSTRACT

The apparatus includes a magnetic sound reproducer having a record mounting surface adapted to support an audiovisual record sheet having a magnetic record surface facing downwardly, the sheet including a base formed with holes for correctly positioning the sheet on the support surface. A holddown means includes a frame mounted for pivoting toward the mounting surface and carrying a Fresnel lens having an irregular surface facing downwardly, the frame further carrying a transparent plate beneath the Fresnel lens and protecting the irregular surface thereof.

2 Claims, 4 Drawing Figures

AUDIO-VISUAL APPARATUS INCLUDING MAGNETIC SHEET MOUNTING AND HOLD-DOWN MEANS

This is a division of application Ser. No. 174,701 filed Aug. 25, 1971, now U.S. Pat. No. 3,752,574 issued Aug. 14, 1973.

FIELD OF THE INVENTION

This invention relates to audio-visual apparatus including a magnetic record sheet mounting means having a mounting surface and novel hold-down means, including a Fresnel lens, for holding the record sheet against the mounting surface.

BACKGROUND OF THE INVENTION

In various applications, an overhead projector, for projecting an image of a picture onto a screen, and a magnetic sheet sound reproducing unit, for reproducing a sound recorded on a magnetic sheet, have been used separately so that each serves its own functions, and such a combination is now used widely as an audio-visual aid. By structurally combining the two types of devices and a teaching material into a single device, it is possible to provide a novel audio-visual apparatus which facilitates the best use of the features of the two devices while obviating their defects.

An overhead projector is useful only for projecting images of pictures onto a screen, so that it is necessary for the operator, or some other person, to provide a commentary on the pictures. It is troublesome for such a person to repeat the same explanation each time there are fresh audiences. A magnetic sheet sound reproducing unit reproduces sound previously recorded on one surface of a magnetic recording sheet and, at the same time, projects a picture recorded on the other surface of the magnetic sheet so that audiences can see an image of the picture while listening to the reproduced sound. However, the size of the audiences which can be reached by such an apparatus is limited.

By structurally combining an overhead projector and a magnetic sheet sound reproducing unit into a single device, it is possible to provide a novel audio-visual apparatus which functions as an overhead projector, augmented with the sound of a magnetic sheet record, and capable of throwing a large picture onto a screen. For example, a teacher in a classroom may use this novel audio-visual apparatus as a teaching aid, and can teach a number of students merely by operating the apparatus to display pictures projected onto a screen on a large scale while the recorded sound is being reproduced to explain the projected picture or to transmit other information.

A prior art overhead projector, of the reflection type, comprises a lamp, serving as a light source, and a small reflector disposed in the upper portion. A Fresnel lens and a reflector, for reflecting upwardly an image of graphic or visual material, are disposed in the lower portion. The light rays from the lamp incident upon the picture to be projected, which is disposed below the lamp, are reflected upwardly by the reflector. The reflected light rays are condensed by the Fresnel lens positioned above the reflector and thus directed toward the small reflector disposed in the viscinity of the lamp, and which reflects the reflected rays of light in a horizontal direction so as to project an image of the original into a screen.

Such a conventional overhead projector has disadvantages. For one thing, an original sheet, containing graphic or visual material to be projected, is formed integrally with a Fresnel lens, with the result that the original sheet is very expensive. For another, in one type of reflection procedure, in which the reflector and the Fresnel lens are formed substantially integrally by applying a reflecting material to the irregular surface of the Fresnel lens, the original sheet must be placed over the Fresnel lens, thereby causing a double image of the original sheet to be projected on the screen. This latter disadvantage will be described in further detail with reference to FIG. 4, which illustrates the manner of reflection of light rays by a Fresnel lens.

Referring to FIG. 4, a reflector surface is formed on an irregular surface 25*a* of a Fresnel lens 25, by depositing thereon, by vaporization in a vacuum, a material for forming a mirror surface. An original 26, of transparent material, carrying graphic or visual material to be projected by a projector using Fresnel lens 25, is superposed on the upper surface 25*b* of Fresnel lens 25. Light rays *d*, directed toward the original 26, pass through the original and through Fresnel lens 25, and our reflected, as light rays *e*, by the irregular surface 25*a* of Fresnel lens 25 so as to be directed toward a reflector lens disposed above the arrangement. Because the light rays *d* and the light rays *e*, of specular reflection, pass through original 26, a double image of graphic or visual material on the original sheet is projected onto the screen. In addition to the light rays *e* of specular reflection, light rays *f* of irregular reflection from the surface of the original 26 are also directed toward the reflector lens. As a result, a weak image of the original is formed on the screen by irregular reflection, in addition to a regular image of the original. This double image exhibits a greater discrepancy between the regular and the shadow images, in being further displaced from the center of the projected picture.

SUMMARY OF THE INVENTION

In accordance with the invention, an audio-visual apparatus includes a magnetic sound reproducer having a supporting surface arranged to receive and support a magnetic recording sheet having a magnetic recording on its undersurface, for cooperation with the sound reproducer, and graphic or visual material on its upper surface, for cooperation with an overhead projector. A frame having substantially the same size as the magnetic recording sheet is pivotally mounted for swinging down against the magnetic recording sheet supported on the supporting surface of the magnetic sound reproducer. This frame carries a Fresnel lens having an irregular surface facing downwardly, and the frame also carries a transparent plate beneath the Fresnel lens and protecting the irregular surface thereof. The invention arrangement thus provides magnetic sheet mounting and hold-down means which avoid formation of a double image on a screen, when a picture is projected onto the screen by the audio-visual apparatus.

An advantage of the invention is that the formation of a double image on the screen can be avoided. Another advantage resides in the fact that the cost for producing an original sheet, containing graphic or visual material to be projected, can be reduced, by separating the original sheet from the Fresnel lens and pivotally connecting sheet hold-down means, including the Fresnel lens and a transparent plate protecting the irregular surface of the Fresnel lens, to the main body of the sound reproducer, for swinging down into engagement with a recording sheet.

An object of the invention is to provide an audio-visual apparatus utilizing a Fresnel lens of substantially the same size as a magnetic recording sheet used with the magnetic sound reproducer.

Another object of the invention is to provide such an audio-visual apparatus in which the Fresnel lens serves to hold down the magnetic sheet against a sheet supporting surface of this magnetic sound reproducer.

A further object of the invention is to provide magnetic recording sheet mounting and hold-down means which avoid formation of a double image on a screen when a picture is thrown onto the screen by the audio-visual apparatus.

For an understanding of the principles of the invention, reference is made to the following description of a typical embodiment thereof as illustrated in the accompanying drawing.

DESCRIPTION OF THE PREFERRED EMBODIMENT

Figure 1:
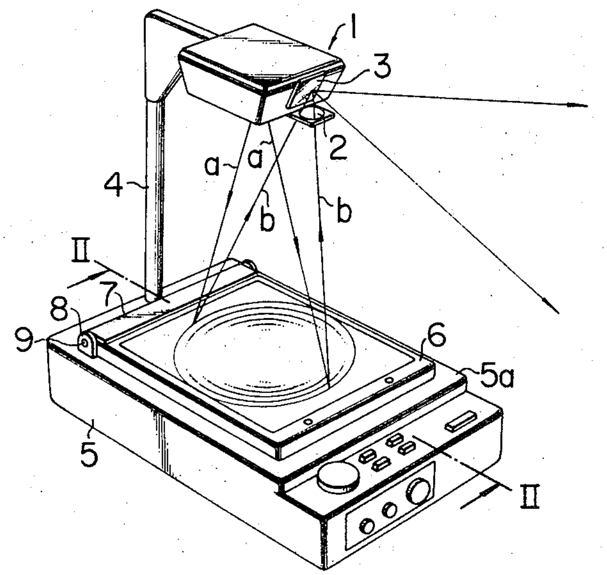
FIG. 1 is a perspective view of an audio-visual apparatus in accordance with one embodiment of the invention.

Referring to FIG. 1, a projection lamp (not shown), having a low level of brightness, is built into the interior of a head 1 of an overhead projector, in a well known manner, so as to direct light rays downwardly as indicated by the arrows *a*. Head 1 further includes a projection lens 2 for condensing reflected light rays *b*, described subsequently, and a reflector 3 for directing the light rays, passing through lens 2, toward a screen (not shown). A support 4 for head 1 has its base secured to one end of an upper surface or record support 5a of a well known form of magnetic sound reproducing means 5 for reproducing sound magnetically recorded on a magnetic sheet. A pivotally mounted sheet hold-down means 6 is arranged on the upper surface 5*a* of reproducing means 5, and a mounting member 7, secured to one end of sheet hold-down means 6, is pivotally connected, by a pviot 9, to a retaining or holding member 8 secured to the upper surface 5a of reproducing means 5.

Figure 2:
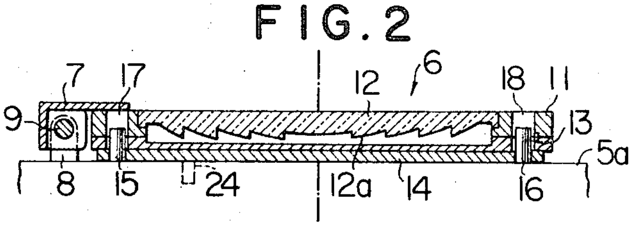
FIG. 2 is a sectional view taken along the line II—II of FIG. 1 and separately illustrating a magnetic recording teaching material sheet, containing graphic and visual material and a pivotally mounted sheet hold-down means.

Referring to FIG. 2, hold-down means 6 comprises a square frame plate 11, a Fresnel lens 12 and a style strip 13. Fresnel lens 12 is secured to frame plate 11 by being fitted therein with its irregular surface 12a facing downwardly. Transparent style strip 13, which is secured to the underside of frame plate 11, performs the functions of protecting the irregular surface 12*a* of Fresnel lens 12 and of holding down and audio-visual teaching material sheet 14 resting on the upper surface 5*a* of reproducing means 5. Pins 15 and 16 are secured to the upper surface 5*a* of reproducing means 5, to project upwardly therefrom, for positioning sheet 14, and apertures or holes 17 and 18 are formed in frame plate 11 and style strip 13 to receive pins 15 and 16.

Figure 3:
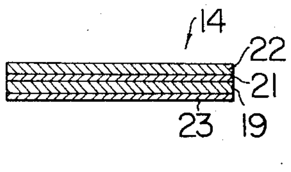
FIG. 3 is a fragmentary enlarged sectional view of the teaching material sheet.
Figure 4:
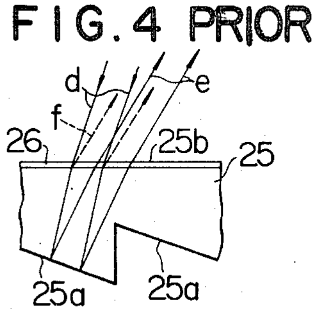
FIG. 4 PRIOR ART
FIG. 4 is a fragmentary enlarged sectional view explaining the manner of reflection of light rays by a Fresnel lens when a conventional teaching material sheet is used.

Referring to FIG. 3, teaching material sheet 14 comprises a base 19, a reflector 21, a transparent sheet 22, carrying graphic or visual information, and a magnetic recording sheet 23 combined into a single compound sheet. A pick up head 24 of reproducing means 5 is adapted to engage the undersurface of magnetic recording sheet 23, as shown in FIG. 2, when the audio-visual sheet is mounted on supporting surface 5*a* of reproducing means 5. Head 24 moves along a spiral magnetic track formed on the undersurface of magnetic recording sheet 23.

Reflector 21 can be eliminated by providing a reflector surface on the upper surface of base 19 of sheet 14, or the base itself may be made from aluminum of other reflecting material. The transparent sheet 22 can be eliminated if writing or a picture is superposed on reflector 21.

By superposing the sheet carrying the graphic material, the reflector and the magnetic recording sheet on each other, and thus forming a compound single audio-visual sheet, it is possible to provide, in a single operation, graphic material, to be projected by the overhead projector, and a magnetic recording, to be reproduced by reproducing means 5.

On the other hand, the Fresnel lens, which has hitherto been provided with each sheet containing graphic material, has been separated therefrom and pivotally connected to the reproducing means, in accordance with the invention. This is condusive to reduced production costs of audio-visual sheets, because it is not necessary to provide a Fresnel lens on each sheet, as is the case with conventional overhead projectors.

While a specific embodiment of the invention has been shown and described in detail to illustrate the application of the principles of the invention, it will be understood that the invention may be embodied otherwise without departing from such principles.

What is claimed is:

1. Hold-down means for maintaining an audio-visual recording sheet, having an audio recording on an undersurface thereof and a visual information recording on an upper surface thereof, on a recording sheet mounting surface of a sound reproducer, comprising, in combination, a frame mounted on said mounting surface for pivoting toward and away from said mounting surface; a Fresnel lens mounted in said frame and having an irregular surface facing downwardly when said frame is positioned on an audio-visual recording sheet on said mounting surface; and a flat transparent plate mounted in said frame beneath said Fresnel lens and protecting the irregular surface of said Fresnel lens.

2. Hold-down means, as claimed in claim 1, in which said mounting surface has pins projecting upwardly therefrom to engage in apertures in an audio-visual recording sheet to locate the sheet precisely on said mounting surface; said frame and said transparent plate having apertures receiving said pins when said frame is pivoted toward said mounting surface.

* * * * *